United States Patent
Koyanagi

(10) Patent No.: US 6,508,270 B2
(45) Date of Patent: Jan. 21, 2003

(54) SHUT-OFF VALVE

(75) Inventor: Yoshihiro Koyanagi, Kashiwara (JP)

(73) Assignee: Kabushiki Kaisha Kashiwara Seitai, Osaka (JP)

( * ) Notice: Subject to any disclaimer, the term of this patent is extended or adjusted under 35 U.S.C. 154(b) by 0 days.

(21) Appl. No.: 09/843,872

(22) Filed: Apr. 30, 2001

(65) Prior Publication Data
US 2002/0134435 A1 Sep. 26, 2002

(30) Foreign Application Priority Data
Mar. 21, 2001 (JP) .................................. 2001-079880

(51) Int. Cl.⁷ .............................................. F16K 15/18
(52) U.S. Cl. ........................ 137/522; 137/512; 137/852
(58) Field of Search ................................. 137/522, 508, 137/511, 512, 852, 854, 853, 855

(56) References Cited

U.S. PATENT DOCUMENTS 5,165,449 A * 11/1992 Yoon ...................... 137/852 X
5,209,264 A * 5/1993 Koyanagi ................... 137/852
5,456,284 A * 10/1995 Ryan et al. ................. 137/522

* cited by examiner

Primary Examiner—Kevin Lee
(74) Attorney, Agent, or Firm—Birch, Stewart Kolasch & Birch, LLP

(57) ABSTRACT

The present invention relates to a shut-off valve of limiting flow to a single direction, and a shut-off valve of removing air from the sack and charging the sack with air as well. The shut-off valve has an air passage of a flat and substantially cylindrical form in cross section, which is formed by opposed cladding sheets. The cladding sheet is provided with a valve body sheet which comprises a fixed part attached to the cladding sheet and flap portions with the fixed part placed in the central position therebetween, which flap portions are movable in a vertical direction. One flap portion serves to prevent air from flowing in one direction within the air passage by the close contact with cladding sheet, while the other flap portion serves to prevent air from flowing in the other direction by the close contact with the cladding sheetu The shut-off valve may perform a double function of removing air from the sack and charging the sack with air accordingly.

3 Claims, 4 Drawing Sheets

SHUT-OFF VALVE

BACKGROUND OF THE INVENTION

1. Field of the Invention

The present invention relates to a shut-off valve for use in a compression sack.

2. Description of Background Art

Compression sacks provided with a shut-off valve for compactly packing clothing or bedding therein have long been known in the art.

Typically, to pack clothing in such a compression sack, a zipper disposed on an access port for contents is closed, and the compression sack is manually compressed, or a vacuum connected by a nozzle to the shut-off valve is actuated to draw out air inside the sack and to expel same through the shut-off valve. Since the shut-off valve may function to limit airflow to a single or outward direction, air may be prevented from reentering the compression sack. As a result, extremely low air pressure can be maintained.

The volume of such stored goods as clothing or bedding contained in the compression sack can be decreased by removing air within the sack. As a result of this decreased volume, more compact packaging can be achieved.

Shut-off valves may take various shapes. For example, the shut-off valve may have a flat, cylindrical body made of a flexible synthetic resin film provided with an opening. The cylindrical body may include a bent passage formed, e.g., by hot-pressing part of the film.

When such a shut-off valve is mounted on the compression sack designed for maintaining a low internal air pressure, the compression sack is in such a state that air can be easily introduced into the sack via the shut-off valve during deaeration. However, since the passage remains crushed flat, it does not allow the entry of air to flow from outside into the sack. Thus, the air pressure within the compression sack remains low.

However, even though such a shut-off valve has a simple structure, the passage itself may not remain closed, and the introduction of some air from the outside may not be avoided completely. Thus, air may gradually reenter the sack with the lapse of time.

Therefore, the goal of the present invention is to provide a shut-off valve having a simple structure and a function which serves to prevent the entry of air in an effective manner. The shut-off valve of the present invention is not only capable of removing air from the sack, but is also capable of charging the sack with air or allowing air to reenter the sack when desired.

SUMMARY AND OBJECTS OF THE INVENTION

To achieve this goal, a first aspect of the present invention provides a shut-off valve in which an air passage 41 having a flat and substantially cylindrical shape in cross section is formed by closing both sides of opposed cladding sheets 43a, 43b by means of closing members 43e, 43f. The air passage 41 has openings 43c, 43g at the both ends, and a valve body sheet 42 inside thereof. The valve body sheet 42 includes a fixed member 42a secured to said cladding sheet 43b, a first flap member 42b, and a second flap member 42c, with the fixed member 42a disposed in a central position therebetween. Both of the flap members are movable about the fixed member 42a. The first flap member 42b serves to prevent air from flowing from opening 43c at one end to opening 43g at the other end of said air passage 41 by maintaining close contact between the first flap member 42b and a surface 43i of the other cladding sheet 43a at the air passage side 41. Similarly, the second flap member 42c serves to prevent air from flowing in the reverse direction from opening 43g to opening 43c of the air passage 41 by maintaining close contact between the second flap member 42c and the surface 43i of the other cladding sheet 43a at the air passage side 41.

Thus, a shut-off valve is provided which alternatively can perform the function of removing air from the sack at one time and, at a later time, charging the sack with air again.

In a second aspect of the present invention, the shut-off valve as described above has opposed cladding sheets 43a, 43b, the cladding sheet 43a also serving as a sheet 11 from which a sealable sack may be made.

This makes it possible to produce a shut-off valve formed integrally with a sack, thereby avoiding use of redundant materials and reducing production costs.

In a third aspect of the present invention, a shut-off valve is provided wherein the air passage 41 having a flat and substantially cylindrical shape in cross section is formed with an opening, either 43c, 43g, disposed at each end in one axial direction and along at least one of the opposed cladding sheets 43a, 43b. The closing members 43e, 43f cross at right angles to said one axial direction and are disposed at both ends in the other axial direction and along at least one of said cladding sheets. A valve body sheet 42 is secured to a surface 43h of one cladding sheet 43b at the air passage side, which surface is located midway in the air passage 41 and extends along the cladding sheet 43b from one closing member 43e to the other closing member 43f. The closing member 43f is the origin of first and second check valves. The first check valve serves to prevent air from flowing from opening 43c at one end to opening 43g at the other end of the air passage 41 by maintaining close contact between a part of the valve body sheet 42 and the surface 43i of the cladding sheet 43a at the air passage side 41. Similarly, the second check valve serves to prevent air from flowing in the reverse direction from opening 43g to opening 43c. A rod 5 can be inserted into the air passage 41 in such a manner that openings 43c, 43g at either end of the air passage 41 may communicate with each other by virtue of the rod 5. As a result, contact between a part of the valve body sheet 42 and the surface 43i of the cladding sheet 43a at the air passage side 41 will be severed, allowing air to run through the air passage. The air passage 41 is closed again by pulling out the rod 5.

Thus, a shut-off valve is provided which performs the dual function of removing air from the sack and filling the sack with air. In other words, the operating mode can be switched from one mode of allowing the passage of air, to the other mode of preventing the introduction of air.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings, which are given by way of illustration only, and thus are not limitative of the present invention, and wherein.

DETAILED DESCRIPTION OF THE PREFERRED EMBODIMENTS

A compression sack with a built-in shut-off valve will be described as one embodiment of the present invention.

Figure 1:
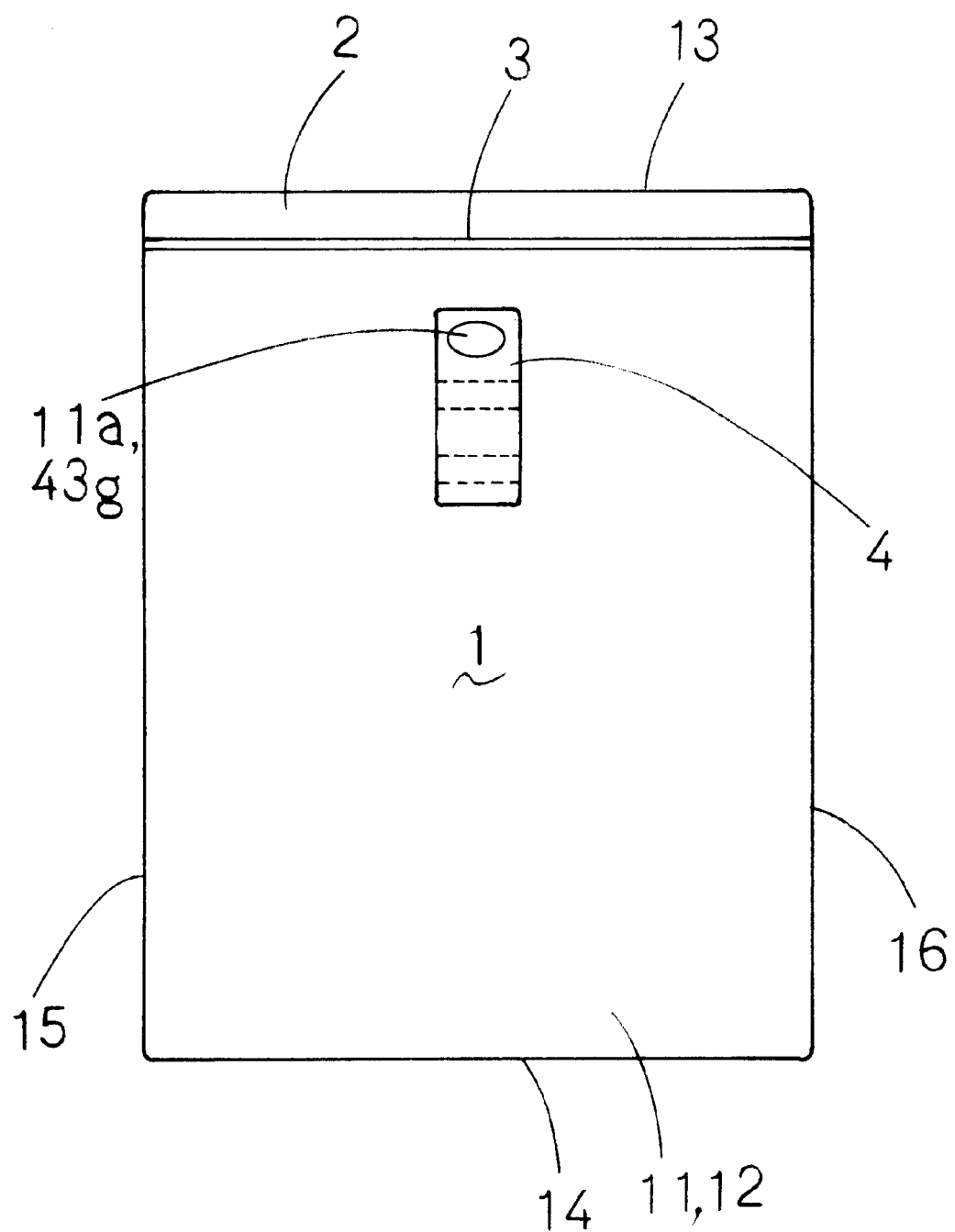
FIG. 1 is a plan view of a compression sack provided with a shut-off valve in accordance with a first embodiment of the present invention.

FIG. 1 is a plan view of the compression sack 1 in accordance with a first embodiment of the present invention. The compression sack 1 is a rectangular-shaped bag when viewed from above, and includes at least two non-breathable sheets 11, 12 made from resin. An access port 2 is disposed on a short upper side 13 of the compression sack. A bottom side 14 and lateral sides 15, 16 remain closed.

The sheet 11 at the surface side of the sack is equipped with a shut-off valve 4 for removing air from the compression sack.

The surfaces of sheets 11, 12 may include print letters indicating trade names, instructions about how to use the sack, or other patterns. Alternatively, the sheets 11, 12 may be treated with antibacterial or deodorizing elements. Furthermore, the compression sack 1 may be sized to the contents being contained, such as clothing, blankets, or bedding. The shut-off valve 4 may be placed in any position on the compression sack 1.

Next, the use of the compression sack will be described. First, a zipper 3 on the access port 2 is opened. Then, contents such as clothing are put into the compression sack 1 through the access port 2, and the zipper 3 is closed. Then, the compression sack 1 is deaerated, rolling it up, or by using a vacuum with its nozzle fitted into the opening 43g of the shut-off valve 4 to remove air from inside of the compression sack 1 via the shut-off valve 4 until the deaeration is completed.

Figure 2A:
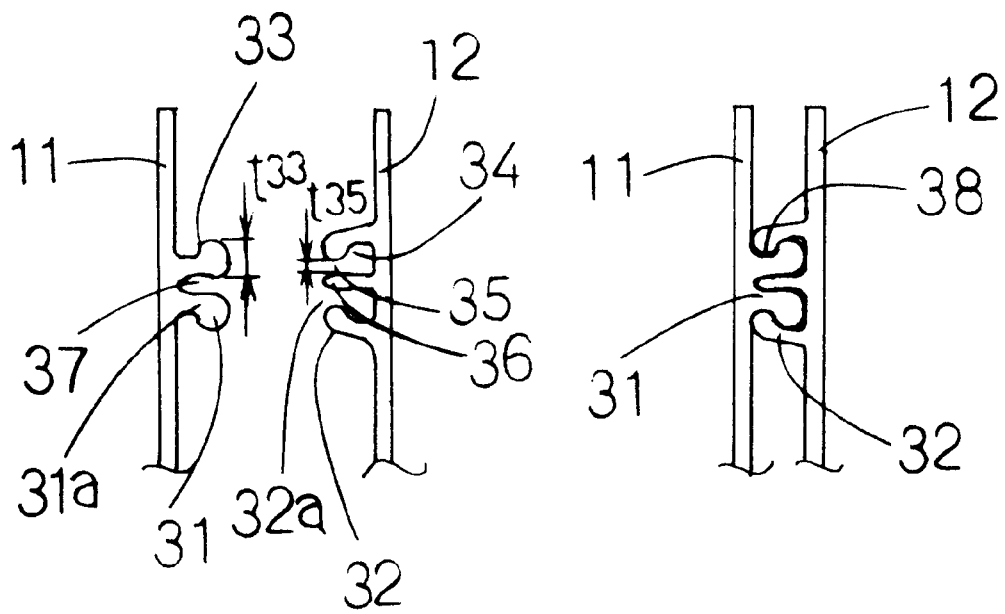
FIG. 2(A) is a cross sectional view of a zipper in accordance with an embodiment of the present invention, on which two opposed pieces are in the open position.

In accordance with an embodiment of the present invention, the zipper 3 which serves as closing means for the access port 2 is a meshing-type zipper, such that two parts thereof may engage with or disengage from each other. As shown in FIG. 2(A), a raised linear portion 31 is formed at one side in the sheet, while a depressed linear portion 32 is formed at the other side.

Both raised and depressed linear portions 31 and 32 are formed with engaging elements 33, 34, respectively. The depressed linear portion 32 includes a raised portion 36 for hermetic sealing, and the raised linear portion 31 includes a depressed portion 37 for hermetic sealing. The raised linear portion 31 has two raised pieces 31a, 31a formed in opposition to each other, with the depressed portion 37 interposed between the raised pieces 31a, 31a. The depressed linear portion 32 is formed with depressed ridges 32a, 32a, between which is positioned the raised portion 36.

Figure 2B:
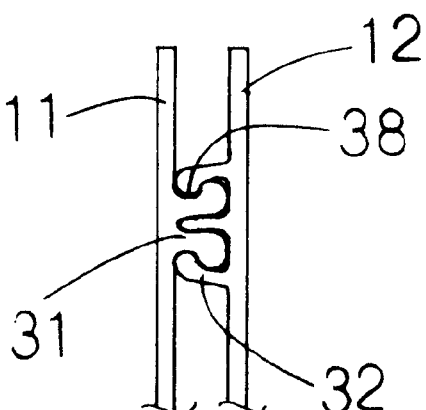
FIG. 2(B) is a cross sectional view of a zipper in accordance with an embodiment of the present invention, on which the two opposed pieces are in the closed position.

A width t35 of a passage 35 in the depressed ridge 32a is made smaller than a width t33 of an engaging element 33. With the zipper 3 open, if the raised linear portion 31 and the depressed linear portion 32 are pressed, the engaging element 33 passes through the passage 35 and meshes with the engaging element 34 of the depressed linear portion 32. Such a meshing position is illustrated in FIG. 2(B). A gap formed at an area 38 between both the linear portions 31 and 32 is so small that air from outside is not allowed to enter, and the compression sack 1 can be kept closed while maintaining its airtightness.

The zipper 3 is not limited to the shape as shown in FIGS. 2(A) and 2(B). Alternative shapes may be employed.

Figure 2C:
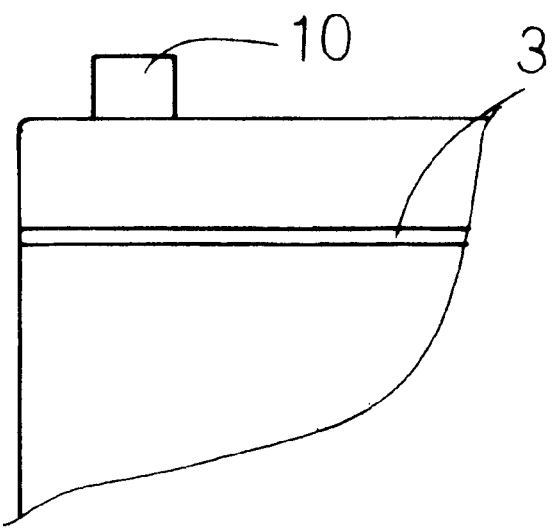
FIG. 2(C) is an enlarged view of a finger grip or lug attached to the sack in accordance with an embodiment of the present invention.

For easy fastening of the zipper 3, a slider piece made of resin may be mounted on the outside of the sack to which the zipper 3 is attached. As shown in FIG. 2(C), at least one of the front and back sheets 11, 12 has an extended part 10, or a small-sized piece of sheet is adhered to the sheet so as to form a finger grip 10 for easy opening of the access port 2.

Figure 3A:
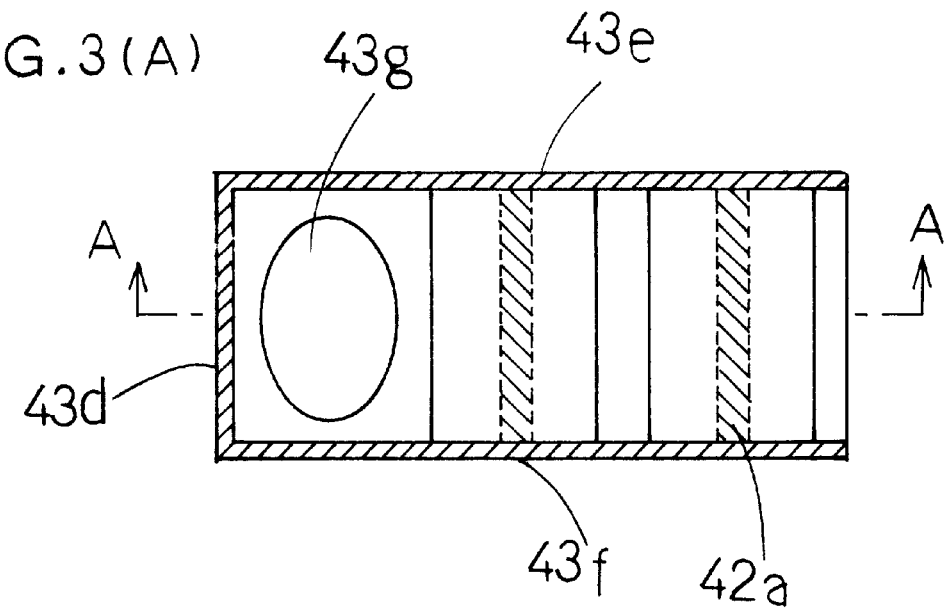
FIG. 3(A) is a plan view of a shut-off valve in accordance with an embodiment of the present invention.
Figure 3B:
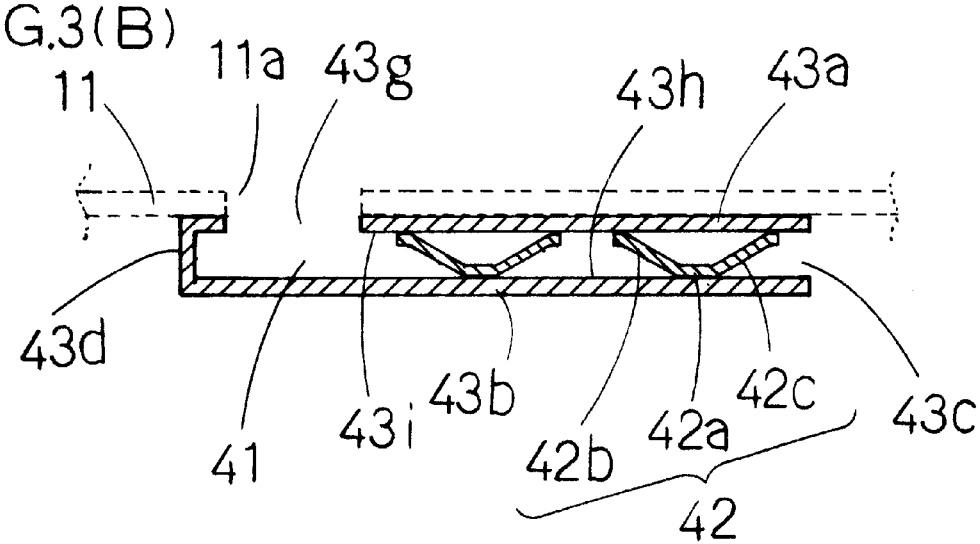
FIG. 3(B) is a cross sectional view of the shut-off valve in accordance with an embodiment of the present invention, taken along line A—A of FIG. 3(A)

As shown in FIGS. 3(A) and 3(B), the shut-off valve 4 is composed of an air passage 41 of a flat and substantially cylindrical form in cross section, and a valve body sheet 42 positioned in the air passage.

The outside portion of the shut-off valve of the present invention includes two opposed rectangular cladding sheets 43a, 43b. An internal opening 43c is formed by opening the respective ends of said cladding sheets at one side. The three remaining enclosure pieces 43d, 43e, and 43f are joined together as by hot-pressing. An external opening 43g is provided near a closed portion 43d of the cladding sheet 43a. This external opening 43g is formed integrally with the interior of the front sheet 11 of the sack where an opening 11a is also formed. Thus, the air passage 41 has a flat and substantially cylindrical form in cross section, and extends from the opening 11a provided in the interior of the face sheet 11 of the sack to the internal opening 43c of the shut-off valve 4.

The air passage may be formed by the cladding sheet 43b which has been attached immediately to the front sheet 11, except that the cladding sheet 43a may not be adhered to the interior of the front sheet 11.

The valve body sheet 42 in the form of a rectangle is mounted on the surface 43h of the cladding sheet 43b at the air passage side, and extends along the cladding sheet 43b from one closed portion 43e to the other closed portion 43f.

As can be seen in FIG. 3(B), the valve body sheet 42 is a single sheet comprising a fixed member 42a glued as by hot-pressing to the cladding sheet 43b at the central part of a short segment thereof, and flap portions 42b, 42c formed at opposite sides of fixed part 42a so as to move up and down. Even though cladding sheet 43a is free from the valve body sheet 42, the air passage 41 may be blocked by pressing the flap portions 42b, 42c down to the surface 43i of the cladding sheet 43a.

The flap portion 42b serves to prevent air from flowing from the outside of the sack to the inside, while the other flap portion 42c acts to cut off the flow of air from the inside of the sack to the outside. Both flap portions 42b, 42c work in tandem on air flowing in either direction through the air passage 41. This feature maintains the internal airless condition of the sack after deaeration and, conversely, holds air within the sack after has been filled.

In accordance with an embodiment of the present invention, the valve body sheet 42 are arranged in two rows so as to meet the axis of the air passage 41 at right angles.

In an embodiment of the present invention, cladding sheets 43a, 43b, and valve body sheet 42 are made of flexible synthetic resin film, so that the flap portions 42b, 42c of the valve body sheet 42 can flexibly stick to the surface 43i of the cladding sheet 43a at the air passage side. Therefore, there is no risk of a gap forming between the valve body sheet and the cladding sheet 43a. This ensures that the sack will stay airtight.

The valve body sheet 42 is not limited to the configuration described so far. It may be made in alternative forms. For example, a pair of valve body sheets, each having flap portions formed on a single side of the fixed member 42a may be arranged opposite to, in series with, or parallel to each other.

Figure 4:
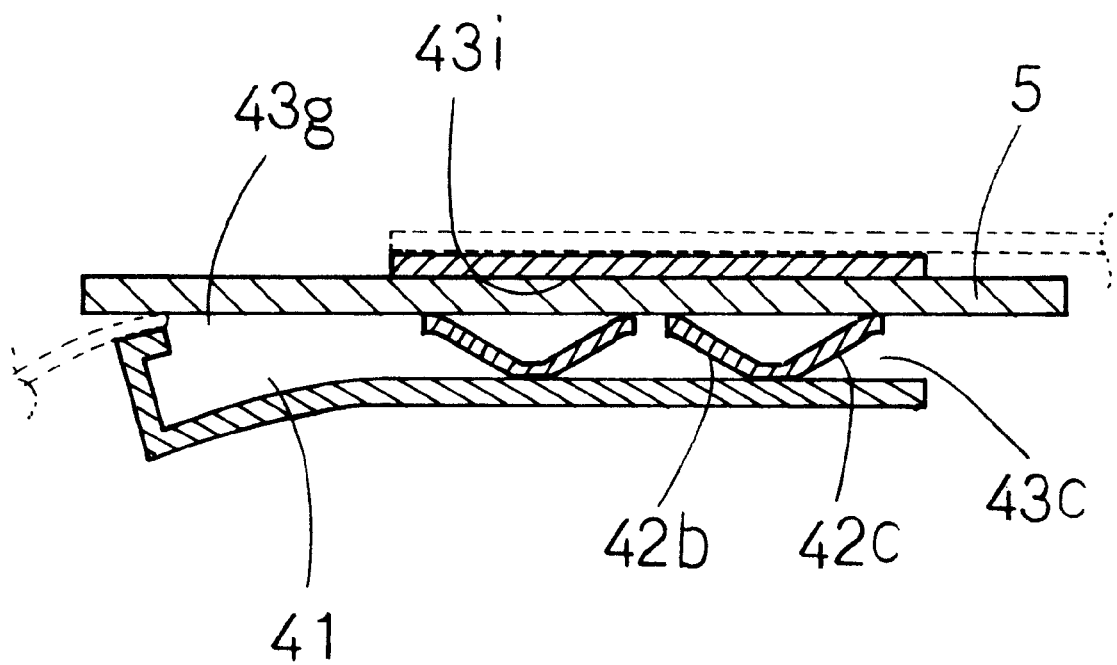
FIG. 4 is a cross sectional view of a shut-off valve in accordance with an embodiment of the present invention, taken along line A—A of FIG. 3(A), in which the air passage rests in a position where air can move into or out of the air passage.

As shown in FIG. 3(B), airflow through the air passage 41 can be stopped in both directions thereof because the flap portions 42b, 42c are mounted at both sides with the fixed member 42a disposed in a central position therebetween. In order to allow air to pass through the air passage 41, therefore, as shown in FIG. 4, rod 5 can be inserted through the space between the internal opening 43c and the external opening 43g in the air passage 41 so as to connect both openings 43c and 43g. The rod 5 breaks the close contact between the flap portions 42b, 42c and the surface 43i of the cladding sheet at the air passage side, rendering the air passage 41 open to air. The air passage will return to the blocked position by pulling out the rod 5.

The rod 5 may be solid or hollow.

In summary, a first aspect of the present invention provides a shut-off valve in which flap portions are so arranged as to act on both directions of the air passage, thereby making it possible not only to remove air from the sack but also to fill the sack with air.

A second aspect of the present invention provides a shut-off valve formed integrally with the sack, thereby avoiding redundant use of materials and cutting production costs, as well.

A third aspect of the present invention provides a shut-off valve through which air may be removed from the sack, and the sack may be filled with air. Accordingly, the operating mode can be simply and easily switched between one mode in which air is allowed to enter, to the other mode in which air is kept from entering.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A shut-off valve, comprising:
    an air passage (41) having a flat and substantially cylindrical shape in cross section formed by a first cladding sheet (43a), and a second cladding sheet (43b), the first and the second cladding sheets (43a), (43b) being opposed to each other and being sealed to each other by means of closing members (43e), (43f);
    a first opening (43c) at an inner end of the air passage (41);
    a second opening (43g) at an outer end of the air passage (41);
    a valve body sheet (42) inside said air passage, the valve body sheet (42) having a fixed member (42a) secured to said second cladding sheet (43b), a first flap member (42b), and a second flap member (42c) with the fixed member (42a) disposed in the central position therebetween, both flap members being movable centering around the fixed member (42a),
    said first flap member (42b) serving to prevent air from flowing from the first opening (43c) to the second opening (43g) of said air passage (41) by the close contact between the first flap member (42b) and a surface (43i) of the first cladding sheet (43a) at the air passage side, and
    said second flap member (42c) serving to prevent air from flowing from the second opening (43g) to the first opening (43c) of the air passage (41) by the close contact with the second flap member (42c) and the surface (43i) of the first cladding sheet (43a) at the air passage side.

2. The shut-off valve according to claim 1, wherein one of the opposed cladding sheets (43a) (43b) serves as a sheet (11) for constituting a sealable sack (1).

3. A shut-off valve, comprising:
    a first cladding sheet (43a), and a second cladding sheet (43b), each cladding sheet being substantially rectangular in shape and opposed to the other, and each cladding sheet having two sides, an inner end, and an outer end;
    closing members (43e),(43f) for sealing the sides of the first cladding sheet (43a) together with the respective sides of the second cladding sheet (43b) to form an air passage (41) that is flat and substantially cylindrical in shape in cross section;
    a first opening (43c) of the air passage (41) formed at an inner end of at least one of said cladding sheets (43a), (43b);
    a second opening (43g) of the air passage (41) formed at an outer end of said at least one of said cladding sheets (43a), (43b);
    a valve body sheet (42) secured to a surface (43h) of the second cladding sheet (43b) inside the air passage, and substantially midway between said first (43c) and said second opening (43g) in the air passage (41), the valve body sheet (42) extending along the said second cladding sheet (43b) from one closing member (43e) to the other closing member (43f), the valve body sheet (42) forming a first and a second check valve, the first check valve serving to prevent air from flowing from the first opening (43c) to the second opening (43g) in the air passage (41) by the close contact between a part of the valve body sheet (42) and a surface (43i) on the air passage side of the first cladding sheet (43a), and the second check valve serving to prevent air from flowing from the second opening (43g) to the first opening (43c); and
    a rod member (5) being inserted into the air passage (41) for enabling the openings (43c), (43g) at either end of the air passage (41) to communicate with each other by the presence of said rod member (5), thus severing close contact between the valve body sheet (42) and the surface (43i) on the air passage side of the first cladding sheet (43a), and allowing air to run through the air passage (41), the flow of air in the air passage (41) being blocked upon removal of the rod member (5).

* * * * *